May 2, 1933.  C. E. MAYNARD  1,906,328
VULCANIZING MOLD
Filed June 3, 1931  3 Sheets-Sheet 1

INVENTOR.
BY CHARLES EDGAR MAYNARD
Chapin & Neal
ATTORNEY.

May 2, 1933. C. E. MAYNARD 1,906,328
VULCANIZING MOLD
Filed June 3, 1931   3 Sheets-Sheet 2

INVENTOR.
BY CHARLES EDGAR MAYNARD
Chapin & Neal
ATTORNEY.

May 2, 1933.   C. E. MAYNARD   1,906,328
VULCANIZING MOLD
Filed June 3, 1931   3 Sheets-Sheet 3
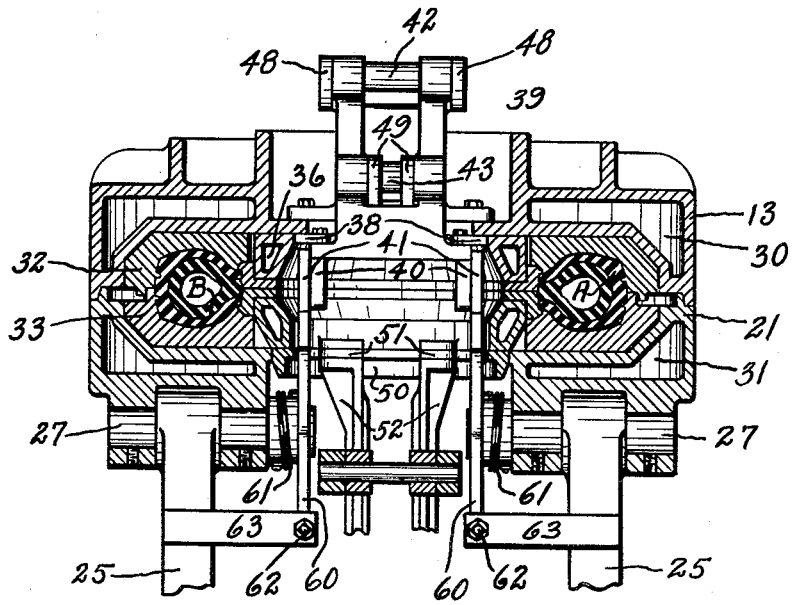
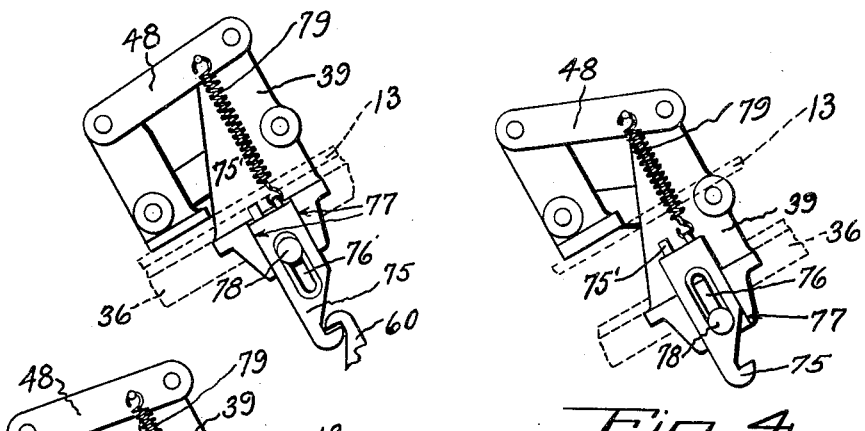
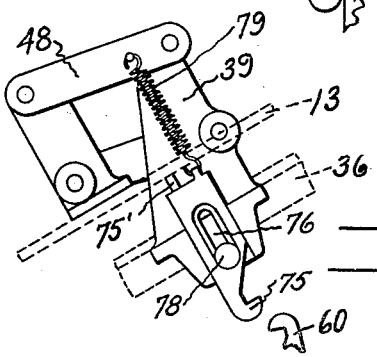
INVENTOR.
BY CHARLES EDGAR MAYNARD
ATTORNEY.

Patented May 2, 1933

1,906,328

UNITED STATES PATENT OFFICE

CHARLES EDGAR MAYNARD, OF NORTHAMPTON, MASSACHUSETTS, ASSIGNOR TO ROLAND W. BOYDEN AND CHARLES A. DANA, AS RECEIVERS FOR THE FISK RUBBER COMPANY, OF CHICOPEE FALLS, MASSACHUSETTS, A CORPORATION OF MASSACHUSETTS

VULCANIZING MOLD

Application filed June 3, 1931. Serial No. 541,857.

This invention relates to vulcanizing molds such as are used for the vulcanizing of pneumatic tire casings and more particularly to means for stripping the cured tire from the mold.

In co-pending application Serial Number 399,754, filed October 15, 1929, is disclosed a vulcanizing mold in which provision is made for stripping the tire from the lower mold half. In some cases the tire adheres to the upper mold half and when this occurs a substantial amount of time and labor is lost in prying the tire from the upper mold half with hand tools. Aside from the time and labor cost involved in this practice, there is also present the danger that the tire will be injured by careless use of the hand tools. It is an object of this invention to provide means for positively stripping the tire from the upper mold half. Other and further objects will be apparent from the following specification and claims.

While the invention is here shown and described as applied to the vulcanizer of the prior application above referred to and while the device as here shown has a special advantage in said vulcanizer, it will be understood that it is equally applicable to other vulcanizers where substantially similar conditions exist.

In the accompanying drawings which illustrate one embodiment of my invention,

Fig. 3 is a transverse fragmentary sectional view taken on line 3—3 of Fig. 1; and Figs. 4, 5 and 6 are detail views of a modified mechanism for stripping tires from the upper mold halves.

Figure 1:
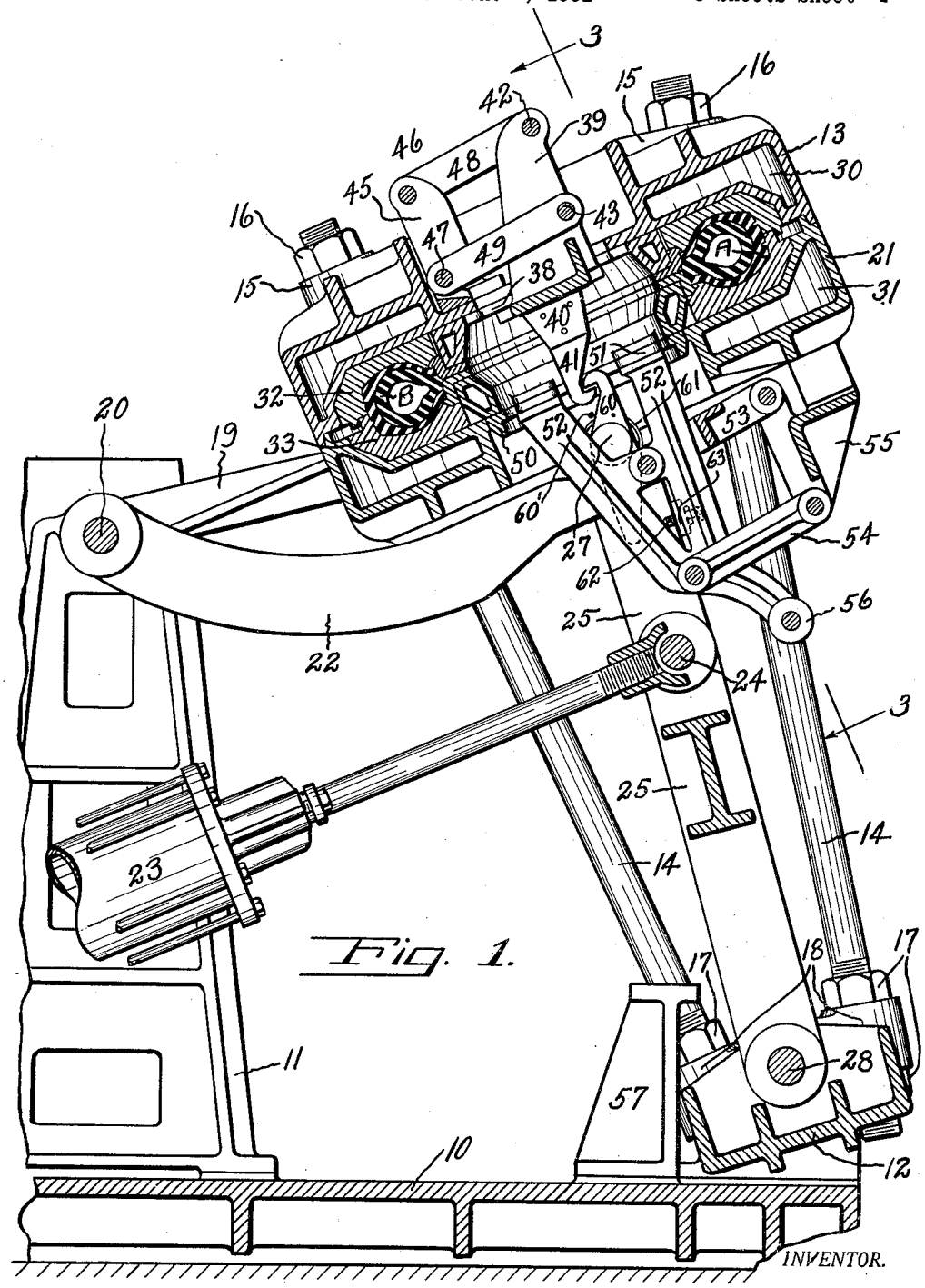
Fig. 1 is a sectional view of a vulcanizing mold in closed or vulcanizing position.
Figure 2:
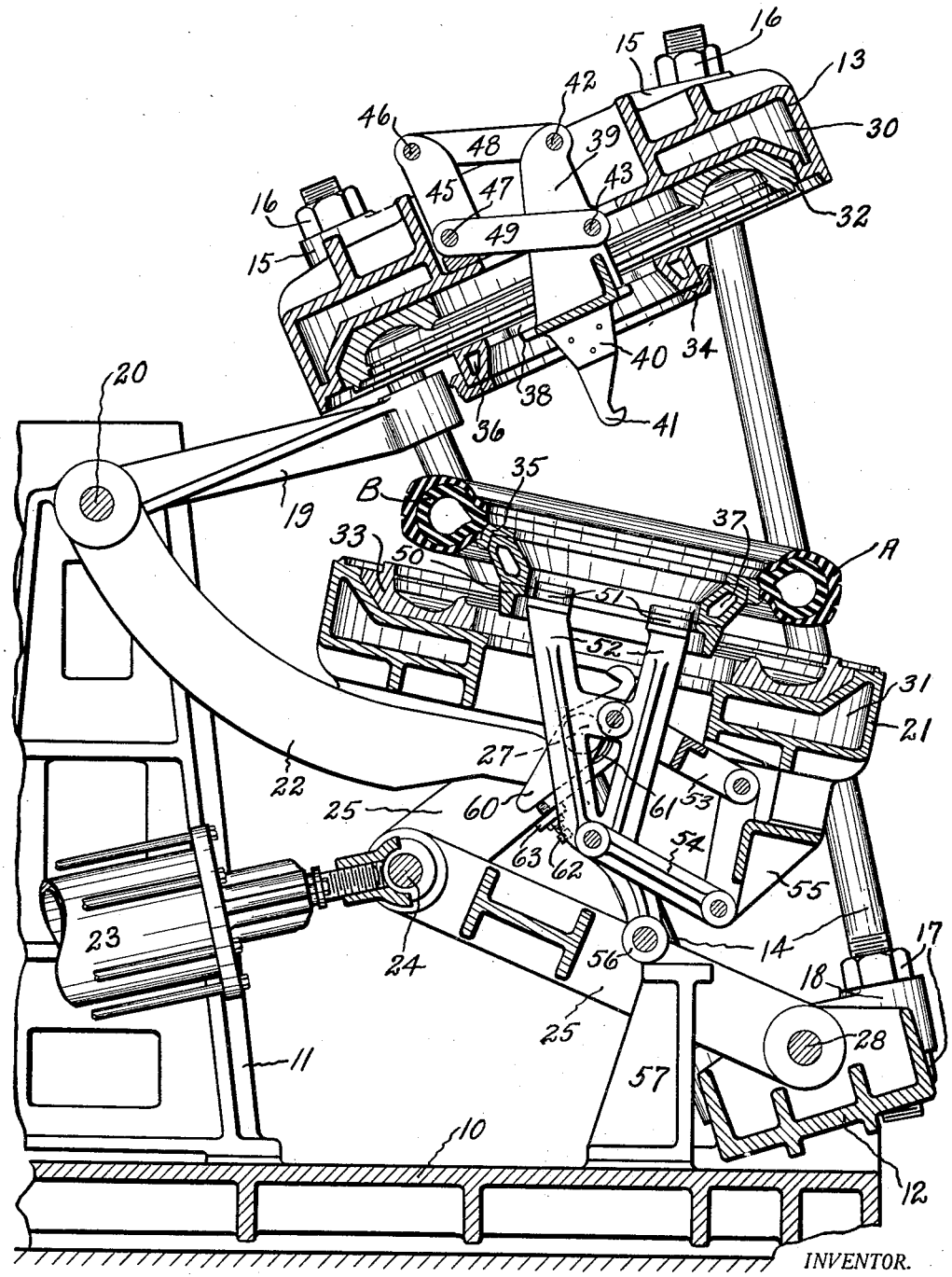
Fig. 2 is a sectional view showing the relative positions of the principal parts of the mold when in open position for loading or unloading.

Referring particularly to Figs. 1 and 2 of the drawings, a base plate 10 is provided upon which is bolted a frame 11 and cross member 12. The vulcanizing mold unit comprises an upper mold half which is held stationary and a movable lower half. The upper stationary mold half is secured in a steam chamber 13 which is supported by rods 14 passing through bosses 15 formed on the outer periphery of the steam chamber, nuts 16 adjustably securing the chamber 13 to the rods 14. The rods on each side of the mold converge toward each other and are adjustably secured by nuts 17 in bosses 18 formed on the outer ends of the adjacent cross member 12.

The chamber 13 is held in an inclined position and the inner pair of rods 14 are connected by bracket arms 19 to shaft 20 carried by frame 11.

The lower movable mold half is secured in a lower movable steam chamber 21, secured to a pair of arms 22 pivoted on shaft 20. The lower mold and its associated parts are moved about the pivot 20 to and from closed relation with the stationary mold half by means of an hydraulic cylinder 23, the piston rod of which is connected to a common pivot 24 of toggle levers 25 pivoted at 27 to the under side of the mold chamber 21 and shaft 28 carried by the cross piece 12. The hydraulic cylinder 23 is pivoted at its closed end to a shaft, not shown, secured in the frame.

Referring to Fig. 1, the mold members 13 and 21 are chambered as at 30 and 31, respectively, for the circulation of steam or other heating fluids and are formed to receive respective mold halves 32 and 33. Movable bead rings 34 and 35 are made as separate members provided with separate steam chambers 36 and 37 formed integral with or secured to the rings, each ring being associated with its respective mold half. Attached to lugs 38 of the upper movable steam chamber 36 is a bracket 39 provided with downward extending lugs 40 carrying hooks 41 detachably secured to lugs 40 by screws. Fixed in bracket 39 are parallel shafts 42 and 43. Secured to the upper mold member 13 is a bracket 45 carrying parallel shafts 46 and 47 and pivotally mounted thereon are links 48 and 49 which are pivotally mounted to the bracket 39 attached to the steam chamber 36.

The lower bead ring 35 with its steam chamber 37 is removably secured to an annular supporting ring 50 having lugs 51

(see Figs. 2 and 3) attached to a downwardly extending bracket 52 pivotally mounted by means of parallel links 53 and 54 secured to a bracket 55 carried by the lower mold member 21. Bracket 52 is provided with a roll 56 adapted when the mold member 21 is in lowered position (see Fig. 2) to engage a stop 57 fixed to the base 10.

Just before the lower mold member reaches its completely open position, further downward movement of the bead ring 36 and steam chamber 34 is prevented by the roll 56 contacting with the stop 57 and thus causing the bead ring to strip the tire from the lower mold half. The elevated position of the lower bead ring when the vulcanizer is open facilitates the taking of cured tires out of the mold or placing the raw tires in the mold as it permits a tire to remain on the bead ring without the danger of over curing the lower sidewall of the tire if the removing of the tire from the bead ring or the closing of the mold is for any reason delayed.

Mounted on the enlarged end of each toggle lever shaft 27 is a rotatable hook 60 to which is fastened a coil spring 61 which causes the hook to rotate counterclockwise, as viewed in Fig. 2, about its pivot until rotation is stopped by one of the upper hooks 41, when the mold is in closed or operating position (see Fig. 1). When the mold is open, as shown in Fig. 2, rotation of the hooks 60, under the action of springs 61, is prevented by adjustable screws 62 threaded in crosspieces 63 which are attached to the upper mold closing toggle links 25. Pins 60' are positioned to prevent rotation of hooks 60 beyond the point where they will engage hooks 41 on their upward movement in the event stop 62 is improperly adjusted.

In the operation an uncured casing "A" and curing bag "B" assembly is placed on bead ring 35 substantially in the position shown in Fig. 2 and after the bag "B" has been connected to the fluid pressure supply line, which is not shown, the mold is ready to be closed. As the mold closes the toggle levers 25 move from position shown in Fig. 1 to that shown in Fig. 2, thus locking the mold assembly in position for the curing or vulcanizing operation, as previously described. The screws 62 have been so adjusted that as the upper toggle lever 25 approaches mold closing position hooks 60 engage hooks 41, springs 61 holding the hooks in engaging position as stop screws 62 recede from the lower end of hooks 60. When the casing "A" has nearly completed its upward movement it will contact with the upper bead ring 34 hanging in the position shown in Fig. 2 and bead ring 34 will be automatically positioned on the tire and moved upwardly to the vulcanizing position of Fig. 1 by the continued upward movement of the lower mold half. It will be obvious that since hooks 40 move upwardly with the upper bead ring and hooks 60 move upwardly with shafts 27 the engagement of the hooks is not disturbed.

Upon completion of the actual curing or vulcanizing operation fluid pressure is admitted to the pressure cylinder 23 to cause the lower mold to be returned to the unloading position shown in Fig. 1. Due to the arrangement of the tire stripping mechanism and the engagement of the lower hooks 60 with the upper hooks 41, the tire "A" is first stripped or separated from the upper mold 32 by the downward movement of bead ring 34. As the lower hooks 60 continue downward the catch portions of the hooks are gradually moved out of engagement with the catch portions of the upper hooks 41 by means of the rotative movement given to the lower hooks by their engagement with the screws 62. Before the lower hooks reach their lower-most positions the screws 62 will have caused the catch portions of the hooks 41 and 60 to have been completely disengaged. The rotation of hooks 60 is so timed that they will have been completely disengaged from the upper hooks before the hooks 60 have reached their lower-most position, shown in Fig. 2.

In some cases it may be advantageous to have more clearance between the upper hooks 41 and the lower mold unit to facilitate the loading and unloading of tires of large cross-sections. For this purpose the upper mold hooks 75, in Figs. 4, 5 and 6, are provided with elongated slots 76 and are slidably mounted on the bracket 39 by means or guideways 77 and pins 78. Attached to the upper end of each hook 75 is a tension spring 79 which is fixed to the link 48. When the lower hooks 60 are disengaged from the upper hooks 75 as indicated in Fig. 4, the tension spring will automatically retract the slidable hook members to the position shown in the latter figure. On the upward movement of the lower mold half in the closing operation, the upper bead ring assembly 36 and hooks 75 move upwardly as a unit until pins 75' carried by the hooks engage the face of steam chamber 13, as shown in Fig. 5, restraining further upward movement of hooks 75. The upper bead ring continues to move upwardly until mold closed position is reached, as shown in Fig. 6, hooks 75 being held in position for engagement by lower hooks 60. In the mold opening movement hooks 75 and the upper bead ring assembly are drawn downwardly by hooks 60 to positively strip the tire from the upper mold as previously described, springs 79 retracting hooks 75 for proper clearance when hooks 60 are disengaged.

Having thus described my invention, I claim:

1. In a vulcanizing mold for tire casings and the like, a mold half, a bead ring attached to said mold half for a limited separation therefrom and provided with a depending coupling member, a second mold half movable toward and from the first mold half, to close and open the mold, means movable with said second mold half adapted in the movement of the latter toward the first mold half to engage said coupling member to releasably lock said bead ring to the second mold half whereby the bead ring partakes of a portion of the opening movement of the second mold half to strip the tire casing from the first mold half.

2. In a vulcanizing mold for tire casings and the like, a mold half, a bead ring attached to said mold half for a limited separation therefrom and provided with a depending coupling member, a second mold half movable toward and from the first mold half to close and open the mold, spring actuated means movable with said second mold half operable at a predetermined point in the closing movement of the latter to engage said coupling member to releasably lock said bead ring to the second mold half whereby the bead ring partakes of a portion of the opening movement of the second mold half to strip the tire casing from the first mold half.

3. In a vulcanizing mold for tire casings and the like, an upper mold half, a bead ring attached to the upper mold half for a limited separation therefrom, a depending hook movable with said bead ring, a lower mold half movable toward and from the upper mold half, a hook movable with said lower mold half adapted in the upward movement of the latter to engage said first named hook whereby said bead ring partakes of a portion of the downward movement of the lower mold half, when the mold is opened, to strip the tire casing from the upper mold half.

4. In a vulcanizing mold for tire casings and the like, an upper mold half, a bead ring linked to the upper mold half for a limited separation therefrom, a depending hook movable with said bead ring, a lower mold half movable toward and from the upper mold half, a spring actuated hook movable with the lower mold half, means operable at a predetermined point in the upward movement of the lower mold half to cause said last named hook, under the action of its spring, to engage said first named hook, whereby said bead ring partakes of a portion of the downward movement of the lower mold half, when the mold is opened, to strip the tire casing from the upper mold half.

5. In a vulcanizing mold for tire casings and the like, a mold half, a bead ring attached to said mold half for a limited separation therefrom, a hook secured to the bead ring by a lost motion connection, a spring normally holding the hook adjacent the bead ring, a second mold half movable toward and from the first mold half to close and open the mold, a hook movable with the second mold half, and operable at a predetermined point in the closing movement of the mold to engage said first mentioned hook, and a stop carried by said first mentioned hook to hold the latter, against the action of said spring, in position to be engaged by the second hook, whereby said bead ring partakes of a portion of the opening movement of the second mold half to strip the tire casing from the first mold half.

CHARLES EDGAR MAYNARD.